US011860720B2

(12) United States Patent
Kollias et al.

(10) Patent No.: US 11,860,720 B2
(45) Date of Patent: Jan. 2, 2024

(54) NON-LINEAR CAUSAL MODELING FROM DIVERSE DATA SOURCES

(71) Applicant: International Business Machines Corporation, Armonk, NY (US)

(72) Inventors: Georgios Kollias, White Plains, NY (US); Aurelie Chloe Lozano, Scarsdale, NY (US); Naoki Abe, Rye, NY (US)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 17/354,139

(22) Filed: Jun. 22, 2021

(65) Prior Publication Data

US 2022/0405158 A1 Dec. 22, 2022

(51) Int. Cl.
*G06F 11/00* (2006.01)
*G06F 11/07* (2006.01)
*G06F 16/901* (2019.01)
*G06N 20/00* (2019.01)

(52) U.S. Cl.
CPC ........ *G06F 11/079* (2013.01); *G06F 16/9024* (2019.01); *G06N 20/00* (2019.01)

(58) Field of Classification Search
CPC . G06F 11/079; G06F 11/0709; G06F 11/0751
See application file for complete search history.

(56) References Cited

U.S. PATENT DOCUMENTS

| | | |
|---|---|---|
| 7,177,769 B2 | 2/2007 | Larsson et al. |
| 8,255,346 B2 | 8/2012 | Abe et al. |
| 8,543,533 B2 | 9/2013 | Lozano et al. |
| 8,600,709 B2 | 12/2013 | Guild et al. |
| 8,626,680 B2 | 1/2014 | Lozano et al. |
| 9,536,146 B2 | 1/2017 | Zheng et al. |
| 10,496,468 B2 | 12/2019 | Gefen et al. |
| 10,616,043 B2 | 4/2020 | Wang et al. |
| 2008/0154693 A1 | 6/2008 | Bateni et al. |
| 2009/0157663 A1 | 6/2009 | Kate |

(Continued)

FOREIGN PATENT DOCUMENTS

| | | | |
|---|---|---|---|
| CN | 113159292 A | * | 7/2021 |
| WO | 2018225892 A1 | | 12/2018 |

OTHER PUBLICATIONS

Alex Tank, Ian Covert, Nick Foti, Ali Shojaie, Emily B. Fox, "Neural Granger Causalty," 14 pages, arXiv:1802.05842v2 [stat.ML] Mar. 13, 2021.

(Continued)

*Primary Examiner* — Katherine Lin
(74) *Attorney, Agent, or Firm* — Patterson + Sheridan, LLP

(57) ABSTRACT

Techniques for causal modeling. Historical feature data is received, relating to a plurality of nodes in a system. A machine learning (ML) model is generated, for a node of the plurality of nodes. The ML model is trained to predict a plurality of future feature values for the node based on at least a portion of the historical feature data. A causal graph is generated, for the plurality of nodes, using a feature selection mechanism within the ML model. The feature selection mechanism includes a regularization term encouraging sparsity of nodes in selected features in the ML model.

25 Claims, 11 Drawing Sheets

(56) References Cited

U.S. PATENT DOCUMENTS

| | | | | |
|---|---|---|---|---|
| 2012/0173927 A1* | 7/2012 | Rymeski | ............. | G06F 11/0709 714/E11.029 |
| 2017/0097963 A1* | 4/2017 | Galloway | ................ | G06F 16/29 |
| 2019/0227860 A1* | 7/2019 | Gefen | ................. | G06F 16/9024 |
| 2020/0287923 A1* | 9/2020 | Raghavendra | ....... | G06N 3/0445 |
| 2022/0036191 A1* | 2/2022 | Movshovitz-Attias | ...................... | G06N 20/10 |

OTHER PUBLICATIONS

Anonymous Authors, "Economy Statistical Recurrent Units For Inferring Nonlinear Granger Causality," ICLR 2020, 17 pages.

Khanna, et al., "Economy Statistical Recurrent Units For Inferring Nonlinear Granger Causality," Jan. 14, 2020.

Kalisch, M. and Bu'hlmann, P., "Estimating High-Dimensional Directed Acyclic Graphs with the PC-Algorithm," J. Mach. Learn. Res. 8, 613-636 (May 2007).

Ioannis Tsamardinos, Constantin F Aliferis, and Alexander Statnikov, "Time and Sample Efficient Discovery of Markov Blankets and Direct Causal Relations," Proceedings of the Ninth ACM SIGKDD International Conference on Knowledge Discovery and Data Mining. ACM, 673-678.

Bhattacharjya, Debarun, Dharmashankar Subramanian, and Tian Gao, "Proximal graphical event models," Advances in Neural Information Processing Systems 31, 8136-8145 (2018).

Zeng, C., Wang, Q., Wang, W., Li, T., Shwartz, L., "Online Inference for Time-Varying Temporal Dependency Discovery from Time Series," 2016 IEEE International Conference on Big Data, 1281-1290 (2016).

Geweke, J.F., "Measures of Conditional Linear Dependence and Feedback Between Time Series," Journal of the American Statistical Association 79(388), 907-915 (1984) Abstract Only.

* cited by examiner

| F1 score | service_0 | service_1 |
|---|---|---|
| Separate training | 0.42 | 1 |
| Co-training | 0.50 | 1 |

Figure 10

NON-LINEAR CAUSAL MODELING FROM DIVERSE DATA SOURCES

BACKGROUND

The present invention relates to machine learning (ML), and more specifically, to non-linear causal modeling from diverse data sources.

Microservices architectures (MSA) are being adopted by an increasing number of applications in a variety of domains, including internet of things (IoT) applications, mobile applications, and cloud applications. An application with MSA is typically decomposed into self-contained services that can be deployed independently and with lightweight intercommunication. When implemented correctly, MSAs allow developers to build large-scale systems that can accommodate dynamic customer requirements, and are robust and resilient to disruptions.

To guarantee reliable microservice operation with high uptime, it is helpful to identify performance issues quickly. It is also helpful to pinpoint the root causes of any performance issues (e.g., the malfunctioning MSA service). However, achieving this in MSA systems is highly non-trivial because of a variety of challenges. For example, MSA architectures often include very complex dependencies, with hundreds or thousands of different services. Locating the root cause of a problem can be very difficult as a performance problem from one service can impact many other services and trigger multiple alarms.

As another example, MSA architectures often monitor a very large number of metrics making it difficult to identify the important or relevant metrics to a particular problem. Further, development teams may use different programming languages and technology stacks. It then becomes difficult to detect performance problems and to localize their root causes since such problems may exhibit different symptoms based on the technology stack. As a final example, microservices often need to adapt to evolving customer requirements, and might thus be updated frequently. Due to such updates, identifying problems and their root causes become even harder.

Some prior approaches in the area of ML and causal modeling have attempted to address these general problems, including the neural Granger causal modeling approaches described in Alex Tank et al, "Neural Granger Causality for Nonlinear Time Series," Feb. 19, 2018, and Saurabh Khanna and Vincent Y. F. Tan, "Economy Statistical Recurrent Units For Inferring Nonlinear Granger Causality," Jan. 14, 2020. But these prior approaches fail to meet the challenges described above. First, none of these previous approaches permit multiple features per service. Second, none of the previous approaches incorporate prior information on topology. Third, none of the previous approaches can model causality jointly from multiple datasets, each with partial observations on a subset of services and enforce consistency in the causal relationships uncovered from these datasets.

SUMMARY

Embodiments include a method. The method includes receiving historical feature data relating to a plurality of nodes in a system. The method further includes generating a machine learning (ML) model for a node of the plurality of nodes. The ML model is trained to predict a plurality of future feature values for the node based on at least a portion of the historical feature data. The method further includes generating a causal graph for the plurality of nodes using a feature selection mechanism within the ML model. The feature selection mechanism includes a regularization term encouraging sparsity of nodes in selected features in the ML model. Such regularization may have the advantage of helping to identify which input features are relevant to the output predicted features, for the ML model.

Embodiments further include a system, including one or more computer processors and a memory containing a program which when executed by the one or more computer processors performs an operation, and a computer program product, including a computer-readable storage medium having computer-readable program code embodied therewith, the computer-readable program code executable by one or more computer processors perform an operation. The operation includes receiving historical feature data relating to a plurality of nodes in a system. The operation further includes generating a machine learning (ML) model for a node of the plurality of nodes. The ML model is trained to predict a plurality of future feature values for the node based on at least a portion of the historical feature data. The operation further includes generating a causal graph for the plurality of nodes using a feature selection mechanism within the ML model. The feature selection mechanism includes a regularization term encouraging sparsity of nodes in selected features in the ML model. Such regularization also may have the advantage of helping to identify which input features are relevant to the output predicted features, for the ML model.

Embodiments further include another method. The method includes receiving historical feature data relating to a plurality of nodes in a system. The method further includes generating a machine learning (ML) model for a node of the plurality of nodes. The ML model is trained to predict a plurality of future feature values for the node based on at least a portion of the historical feature data. The method further includes generating a causal graph for the plurality of nodes using a feature selection mechanism within the ML model. The feature selection mechanism includes a regularization term encouraging sparsity of nodes in selected features in the ML model. The ML model and the causal graph are generated by co-training a plurality of ML models using a plurality of training feature data sets relating to a plurality of faults and using group regularization to encourage consistency among feature selection for any given node across the plurality of data sets. The method further includes predicting the plurality of future feature values for the node using the ML model, and, at least one of: (i) detecting an anomaly in the system based on the predicted plurality of feature values or (ii) identifying a root cause for a fault in one of the plurality of nodes in the system based on the predicted plurality of future feature values. Such co-training may have the advantage of performing joint estimation for the ML model.

Embodiments further include another method. The method includes receiving historical feature data relating to a plurality of microservices in a microservice architecture (MSA). The method further includes generating a machine learning (ML) model for a microservice of the plurality of microservices. The ML model is trained to predict a plurality of future feature values for the microservice based on at least a portion of the historical feature data. The method further includes generating a causal graph for the plurality of microservices using a feature selection mechanism within the ML model. The feature selection mechanism includes a regularization term encouraging sparsity of nodes in selected features in the ML model. The method further includes predicting the plurality of future feature values for the microservice using the ML model, and at least one of: (i) detecting an anomaly in the system based on the predicted plurality of feature values or (ii) identifying a root cause for a fault in one of the plurality of microservices in the system based on the predicted plurality of future feature values. Such regularization also may have the advantage of helping to identify which input features are relevant to the output predicted features, for the ML model.

One or more embodiments discussed above may optionally include predicting the plurality of future feature values for the node using the ML model, and at least one of: (i) detecting an anomaly in the system based on the predicted plurality of feature values or (ii) identifying a root cause for a fault in one of the plurality of nodes in the system based on the ML model, the causal graph, and the predicted plurality of future feature values. This may have the advantage of detecting an anomaly in the system or identifying a root cause for a fault in one of the plurality of nodes in the system.

One or more embodiments discussed above may optionally include a non-linear neural network as the ML model. This may have the advantage of facilitating non-linear causal model for non-linear complex tendencies among nodes.

One or more embodiments discussed above may optionally include the ML model and the causal graph being generated by co-training a plurality of ML models using a plurality of training feature data sets relating to a plurality of faults and using group regularization to encourage consistency among feature selection for any given node across the plurality of data sets. Such co-training may have the advantage of performing joint estimation for the ML model.

BRIEF DESCRIPTION OF THE SEVERAL VIEWS OF THE DRAWINGS

FIG. 10 is a table demonstrating improved accuracy attained by using the co-training embodiment in learning a causal graph, according to one embodiment.

DETAILED DESCRIPTION

In an embodiment, ML techniques can be used to address some, or all, of these problems. But it is challenging to address these problems using ML techniques, because of a variety of characteristics of MSA systems. For example, the complex dependencies among microservices are typically non-linear. As discussed further below, this can require non-linear causal modeling. As another example, each microservice can have multiple time-varying features associated to it (e.g., metrics, or logs). When a fault occurs in a microservice, only some of the other services will be affected. This means that each data snapshot associated with the fault is likely to only include metrics or log information for a subset of the services, and therefore is likely to present an incomplete view of the full system. Rather than performing causal modeling from each dataset in isolation, it may be more effective to perform joint estimation, borrowing strength across datasets. Further, due to the complexity of the dependencies and the difficulty of root cause localization, it may be effective to leverage prior information on the topology underlying the microservices.

In an embodiment, as discussed further below, one or more of these problems can be addressed using an ML architecture incorporating non-linear causal modeling among nodes or entities (e.g. among microservices). For example, each node can be permitted to have multiple feature metrics associated to it, and the feature metrics need not be consistent across nodes. Further, the architecture can include a mechanism to incorporate prior information on node topology by, for example, scaling the penalty parameters corresponding to the causal relationship between node pairs according to their degree of relatedness in the topology. As a further example, the architecture can estimate causality from multiple datasets, each with partially observed data, while enforcing consistency in the relationships that are common across datasets.

While one or more of the techniques discussed below are described in the context of microservices and a MSA, this is merely one example. One or more of these techniques can be used to identify causal relationships between any suitable collection of nodes or entities, including devices in an information technology (IT) infrastructure or any other suitable aspect of IT operations management.

Figure 1A:
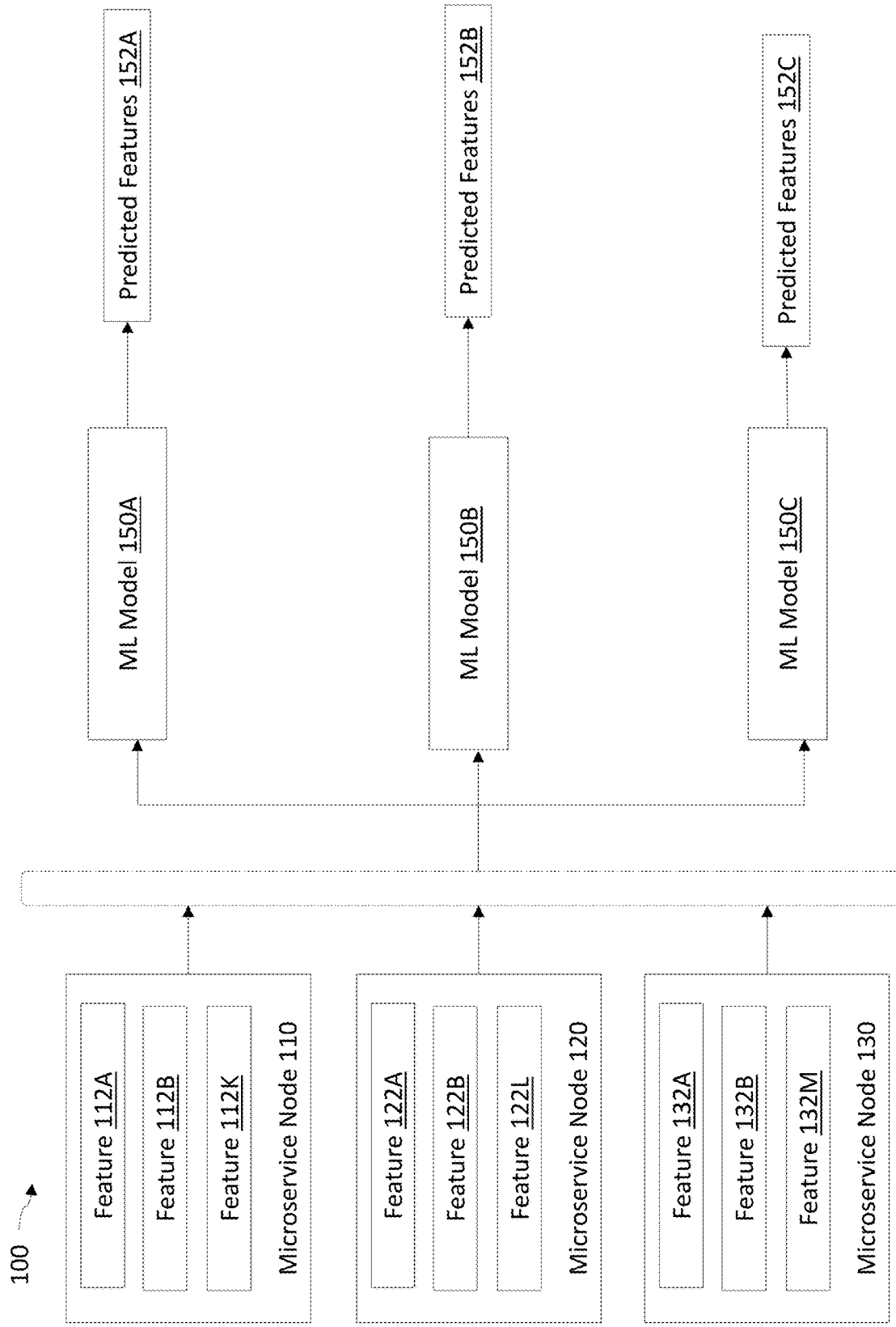
FIG. 1A illustrates an ML architecture for predicting MSA features using non-linear causal modeling from diverse data sources, according to one embodiment.

FIG. 1A illustrates an ML architecture 100 for predicting MSA features using non-linear causal modeling from diverse data sources, according to one embodiment. In an embodiment, the architecture 100 includes numerous microservice nodes 110, 120, 130 and possibly more, generally N of them. Each microservice node 110, 120, and 130 includes a respective collection of features relating to the microservice node. For example, the microservice node 110 includes the features 112A-K (e.g., historical feature data). In an embodiment, each feature 112A-K represents an event happening at a given time t, for a given service i (e.g., the microservice node 110). For example, the features 112A-K can be represented by a vector of numbers: $x_i(t)$. As one example, the features 112A-K could reflect an active or inactive status of the microservice node 110 at time t, the values of various properties of the microservice 110 at time t, an error or debugging status for the microservice 110 at time t, or any other suitable feature. This is merely one example, and any other suitable features can be used.

The microservice 120 similarly includes the features 122A-L, and the microservice 130 includes the features 132A-M. In an embodiment, the features 112A-K, 122A-L, and 132A-M are generally different because they relate to different microservice nodes, and can have different number of features. In some embodiments there can be the same number of features across the different microservice nodes with the same or analogous semantics (e.g., common features that are present in each of the multiple microservices).

In an embodiment, the features 112A-K, 122A-L, and 132A-M are provided to ML models 150A-C, one for each of the microservice nodes, to infer predicted future feature values 152A-C. For example, as illustrated in FIG. 1, the architecture 100 includes multiple ML models 150A-C. As discussed further below, in an embodiment each ML model 150A-C is trained to infer a different collection of predicted future feature values 152A-C, using the same collection of input data: the features 112A-K, 122A-L, and 132A-M.

For example, the ML model 150A can receive all of the features 112A-K, 122A-L, and 132A-M as input. In an embodiment, the features can be concatenated to get a vector of size n. This vector can be expressed as x(t). The ML model 150A can be trained to use this data to predict the future feature values 152A. For example, the predicted future feature values 152A could be feature values for the microservice node 110. In this example, the ML model 150A is trained to use feature data across multiple microservice nodes (e.g., across microservice nodes 110, 120, and 130) to infer predicted future feature values for one microservice node (e.g., for microservice node 110).

In mathematical terms, for x(t) as input, a given ML model will produce a prediction $x_i^+(t+1)$ for $x_i(t+1)$. In this example, $x_i(t+1)$ is the event that the service i (e.g., the microservice node 110) generates at next time t+1 and $x_i^+(t+1)$ is a vector of numbers representing the predicted features. For input x(t), the output of a given ML model (e.g., the ML model 150A) is $x_i^+(t+1)$. As discussed further below, in an embodiment each ML model (e.g., the ML model 150A) is trained and structured to predict features based on partially observed data. For example, the ML model can estimate causality from multiple datasets (e.g., the features 112A-K, the features 122A-L, and the features 132A-M), each with partially observed data (e.g., data of available features for only a subset of relevant microservices).

Similarly, each of the remaining ML models 150B-C can use features from multiple microservices (e.g., all of features 112A-K, 122A-L, and 132A-M from respective microservice nodes 110, 120, and 130) to predict future feature values 152B-C (e.g., each predicting feature values for a respective microservice). In an embodiment, the ML Models 150A-C are structured the same and, as discussed further below, are trained to predict different features. Alternatively some, or all, of the ML models 150A-C can be structured differently. For example, it may be advantageous to structure the ML models 150A-C somewhat differently to improve prediction of different future feature values 152A-C.

Figure 1B:
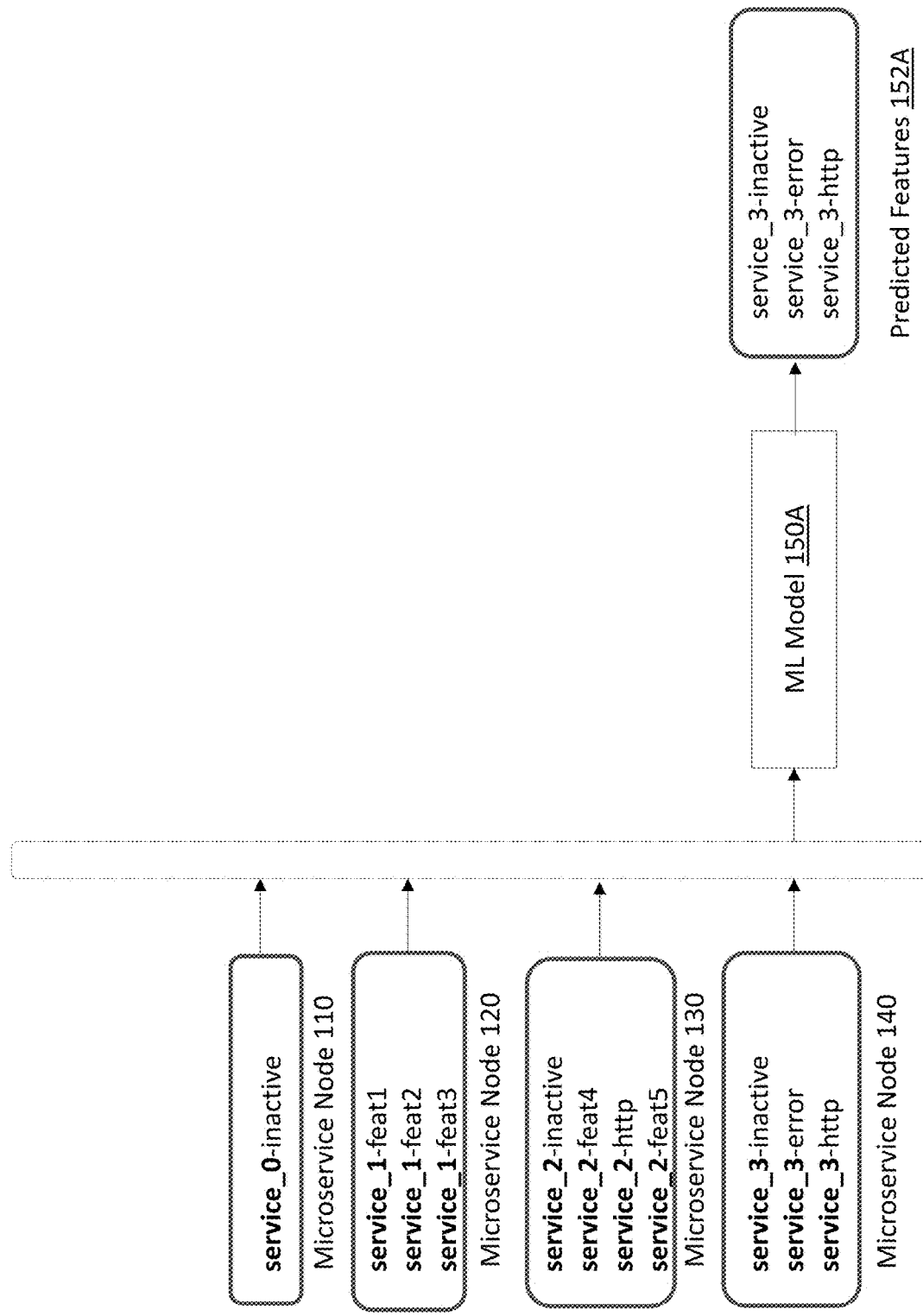
FIG. 1B illustrates an example of one of the ML models in the ML architecture of FIG. 1A, according to one embodiment.

FIG. 1B illustrates an example of one of the ML models in the ML architecture of FIG. 1A, according to one embodiment. This example illustrates a microservice application with a number of associated, heterogeneous features. This example relates to an example microservice system that includes four services: service 0, service 1, service 2, and service 3. Numerous features from the microservice nodes 110, 120, 130, and 140 are used by the ML model 150A to predict the predicted features 152A: here, the values of "service 3-inactive," "service 3-error," and "service 3-http."

Figure 2:
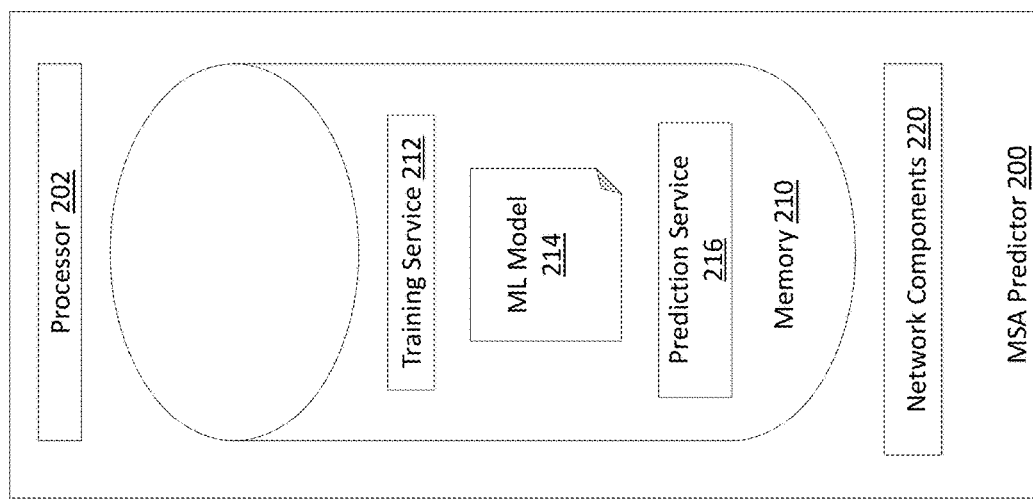
FIG. 2 is a block diagram illustrating an MSA predictor for predicting MSA features using non-linear causal modeling from diverse data sources, according to one embodiment.

FIG. 2 is a block diagram illustrating an MSA predictor 200 for predicting MSA features using non-linear causal modeling from diverse data sources, according to one embodiment. The MSA predictor 200 includes a processor 202, a memory 210, and network components 220. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the MSA predictor to interface with a suitable communication network (e.g., the Internet, a local area network (LAN) or a wide area network (WAN)). For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the MSA predictor 200. The program code is generally described as various functional "applications" or "modules" within the memory 210, although alternate implementations may have different functions and/or combinations of functions. Within the memory 210, the training service 212 facilitates training the ML model 214. Training is discussed further below with regard to FIGS. 3-4.

In an embodiment, the ML model 214 corresponds with any of the ML models 150A-C illustrated in FIG. 1. Further, in an embodiment the ML model 214 can be any suitable ML model, including a suitable non-linear neural network. For example, the ML model 214 can be a multi-variate recurrent neural network. This is merely one example, and any state-preserving neural network may be particularly suitable, including a long short-term memory (LSTM) based network or a multi-layer perceptron network. The prediction service 216 uses the ML model 214 (e.g., after training) to infer predicted features. For example, as discussed above in relation to FIG. 1 and below in relation to FIGS. 5-6, the prediction service 216 can use feature data from multiple microservices to infer predicted values for a given microservice.

Figure 3:
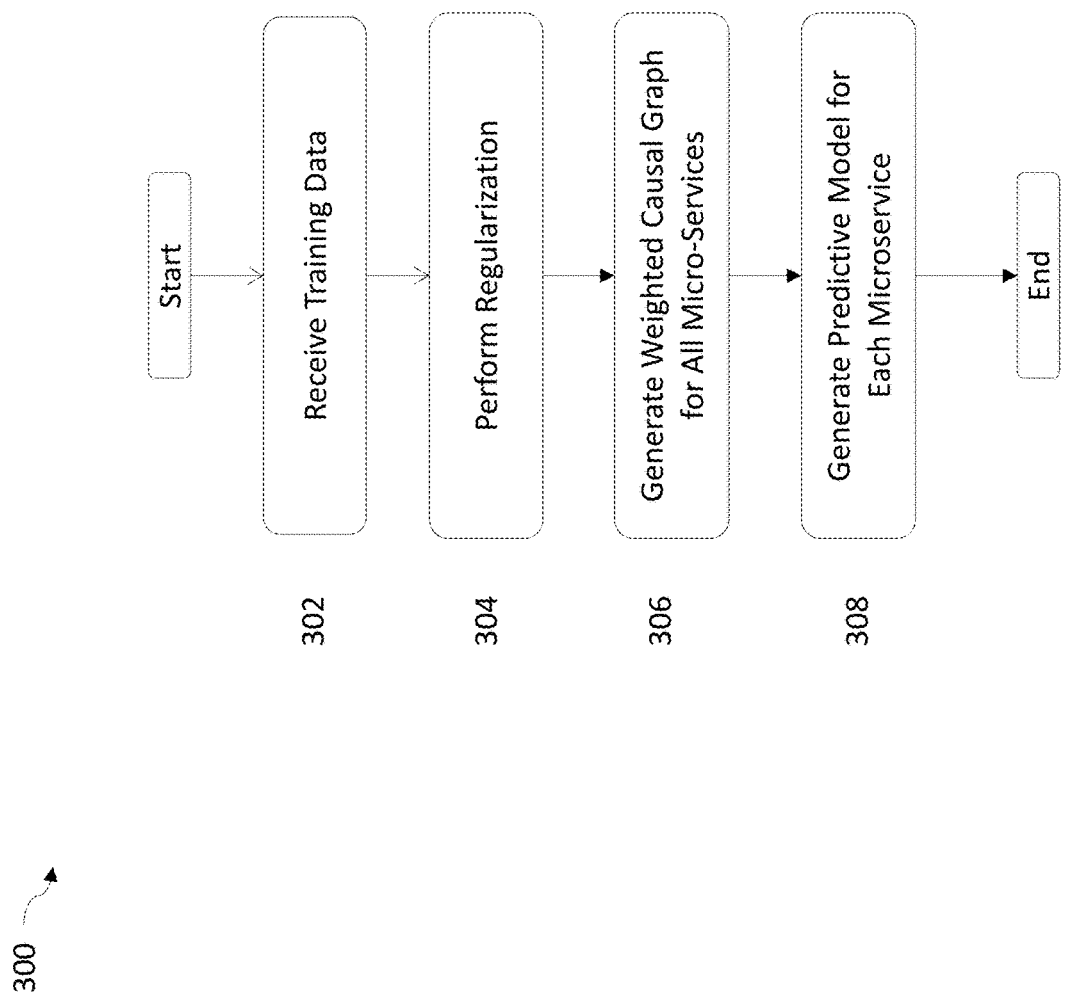
FIG. 3 is a flowchart illustrating training an ML model for predicting MSA features using non-linear causal modeling from diverse data sources, according to one embodiment.

FIG. 3 is a flowchart 300 illustrating training an ML model for predicting MSA features using non-linear causal modeling from diverse data sources, according to one embodiment. At block 302 a training service (e.g., the training service 212 illustrated in FIG. 2) receives training data. As discussed below with regard to FIG. 3, the training data can include collected MSA data, which can be pre-processed prior to training. Further, the training data can include topology graph data relating to the MSA. In addition, as discussed below with regard to FIG. 4, in an embodiment the pre-processing and training can be done as batch training (e.g., all data is provided at once) or as streaming training (e.g., where input data is streaming and the model is constantly updated).

At block 304, the training service performs model fitting with regularization. In an embodiment, the training service trains an ML model (e.g., the ML model 214 illustrated in FIG. 2) using a feature selection mechanism by penalizing input network parameters in a block wise manner. For example, the training service can perform group-sparse regularization, in which all features of a given node (e.g., a given microservice) are forced to be either contributing or not-contributing (e.g., in an all-in or all-out fashion).

As another example, the training service can perform within-group sparse regularization, in which some features from a given node (e.g., a given microservice) contribute while other features from the node are allowed to not contribute. In an embodiment, the loss function that we want to minimize assumes the form: Loss($W_{in}$[i], $W_{rest}$[i]; X1, . . . , $X_n$) $\Sigma_{(i,j)} \lambda_{ij} R(W_{in}[i][j])$. In this expression, $W_{in}$ [i] represents the matrix formed by the input parameters of the model for the service i. $W_{in}$[i][j] is the subset of the parameter matrix concerning the potential causal relationship from node j to node i. R(.) is a regularizer that encourages group-sparsity (e.g., $R(W_{in} [i][j]=\|W_{in} [i][j]\|_2$) or within-group sparsity (e.g., $R(W_{in}[i][j])=\|W_{in}[i] [j]\|_1$). Further, in this example, the parameter, or term, $\lambda_{ij}$ is small if the nodes (i,j) are linked via topology (e.g., in the MSA), and large otherwise.

In other words, the regularizer acts to identify which input features are relevant to the output predicted features. Setting parameter $\lambda_{ij}$ large will encourage input feature values for a given output prediction node to be set lower, making it less likely these features will be considered relevant to the prediction. Setting parameter $\lambda_{ij}$ small will encourage input feature values for a given output prediction node to be set higher, making it more likely these features will be considered relevant to the prediction. In an embodiment, a smaller parameter $\lambda_{ij}$ can be used for nodes that are linked in a topology. This encourages input features from nodes that are linked in a topology, with the output node, to be considered more relevant to the prediction for the output node.

Further, in an embodiment, group regularization and "co-training" can be used. As discussed above, in an embodiment, when a fault occurs in a microservice only a subset of nodes are likely to be affected. Each data snapshot may, therefore, only include a subset of the services. Rather than performing causal modeling from each data set in isolation, it may be more effective to perform joint estimation (e.g., borrowing strength across datasets). The latter joint estimation can be performed using an approach known as "co-training", as described in detail below.

For example, for a given target node i, the training service can fetch all data sets or experiments where this node is observed. This can be expressed as: $D_i^{(1)}, \ldots, D_i^{(n\_i)}$. In an embodiment, the training service can co-train $n_i$ ML models, with common group regularization for weights corresponding to the common candidate source nodes across data sets. This can be expressed as Minimize: Loss($D_i^{(i)}$)+ . . . +Loss ($D_i^{(n_i)}$)+$\lambda \Sigma_j$ ($W_{ji}$ ($D_i^{(1)}$), . . . , $W_{ji}$ ($D_i^{(n_i)}$)$\|_2$. In this expression, $W_{ji}(D_i^{(k)})$ are ML model parameters corresponding to a node pair (j,i) for a data set $D_i^{(k)}$ if j is observed in $D_i^{(k)}$. $W_{ji}(D_i^{(k)})$ are null if (j,i) is not observed in the data set $D_i^{(k)}$. In an embodiment, this group regularization in co-training enforces consistency of edges across graphs (e.g., across weighted causal graphs as discussed below with regard to block 306). For example, if services i and j are casually related in the ML model for data set D(k), then services i and j should also be considered causally related in the ML model for the data set D(l).

At block 306, the training service generates a weighted causal graph for all microservices. In an embodiment, the training service uses a feature selection mechanism, for example the weighted causal graph can be induced by the sparsity pattern of the input parameter matrices. Further, in an embodiment, the weighted causal graph includes associated causal strength for each causal relationship (e.g., between input features and output predictions) and reflects individual feature strengths for each causal relationship. For example, the weighted causal graph can reflect more than a simple binary indication as to whether a given input feature is relevant to the prediction. The weighted causal graph can reflect the strength of the causal relationship (e.g., between the values in the input matrix $W_{in}$ [i] and the prediction for the service i). For example the causal strength from service j to service i could be based on the norm of the input model coefficients corresponding to each node, e.g., the causal strength from node j to node i could be set to $\|W_{in} [i][j]\|_2 / \max_{k,l} W_{in} [k][l]\|_2$, which would be a value between 0 and 1, where 1 would be the strongest strength and 0 would indicate absence of causal relationship from node j to node i.

At block 308, the training service generates a predictive model for each microservice. For example, as discussed above in relation to FIG. 1, in an embodiment multiple ML models 150A-C are trained to predict features, one for each node (e.g., for each microservice). In an embodiment, each trained predictive model can predict the future values of its event features based on the past values of the event features at its causing nodes (e.g., as reflected in the weighted causal graph generated at block 306). Further, as discussed below with regard to FIG. 5, the predictive models can also be used for anomaly detection.

Figure 4:
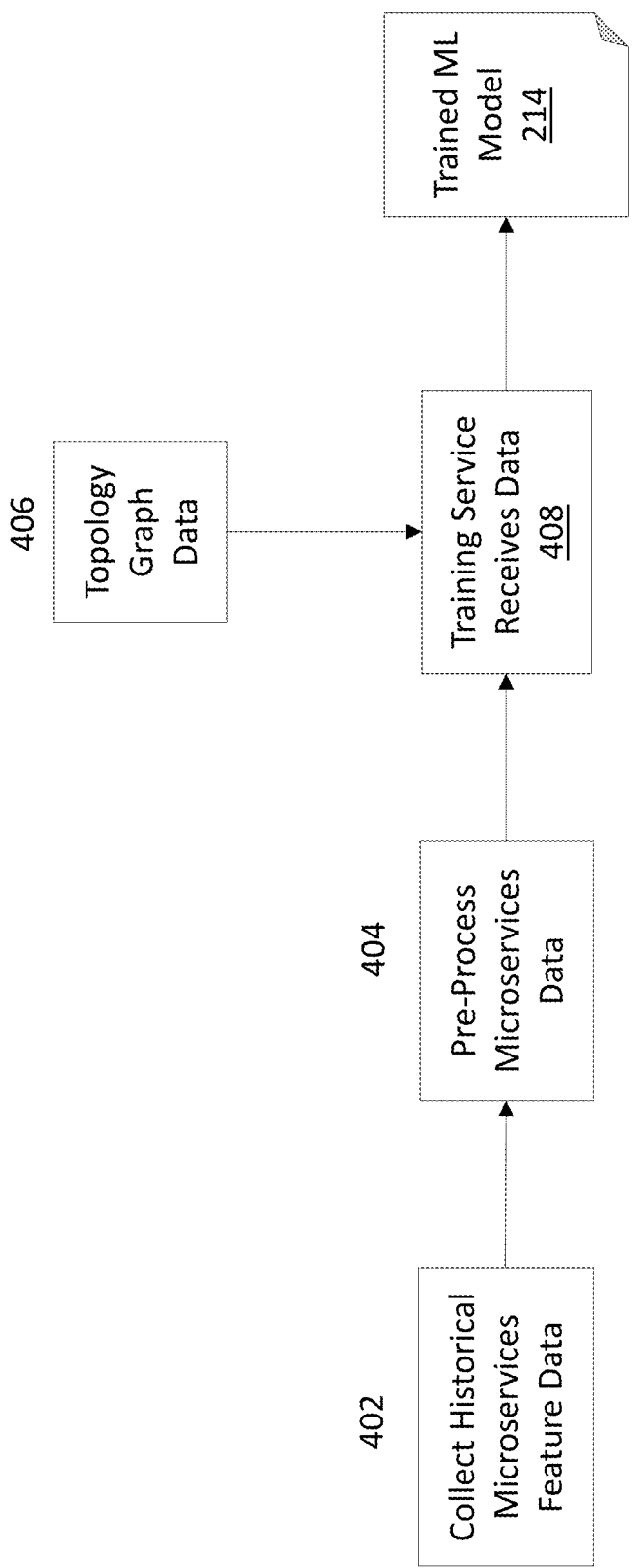
FIG. 4 illustrates training an ML model for predicting MSA features using non-linear causal modeling from diverse data sources, according to one embodiment.

FIG. 4 illustrates training an ML model for predicting MSA features using non-linear causal modeling from diverse data sources, according to one embodiment. At block 402, a training service (e.g., the training service 212 illustrated in FIG. 2), or any other suitable software service, collects historical microservices feature data. For example, the service can gather historical log data for microservice nodes (e.g., microservice nodes 110, 120, and 130 illustrated in FIG. 1) over time. As another example, the service can gather historical metric data for microservice nodes over time.

At block 404, the service pre-processes the microservices data. For example, the service can create feature vectors reflecting the values of various features, for each node's events, over time. In an embodiment, the pre-processing and training can be done as batch training. In this embodiment, all data is pre-processed at once, and provided to the training service.

Alternatively, the pre-processing and training can be done in a streaming manner. In this embodiment, the data is streaming, and is continuously pre-processed and provided to the training service. For example, it can be desirable to take a streaming approach for scalability. The set of training data may be very large, so it may be desirable to pre-process the data, and provide it to the training service, in a streaming manner (e.g., to avoid computation and storage limitations).

At block 406, the service provides topology graph data to the training service. In an embodiment, the training service can optionally use topology graph data in training (e.g., to assist with regularization as discussed above in relation to FIG. 3). For example, a weighted matrix or topology graph reflecting the topology of the MSA can be provided to the training service.

At block 408, the training service receives the data. For example, the training service receives the pre-processed microservices data. Further, the training service can optionally receive the topology graph data. As discussed above in relation to FIG. 3, the training service uses the data to generate the trained ML model 214. For example, the training service can generate a trained ML model for each microservice (e.g., to predict feature values for each respective microservice).

Figure 5:
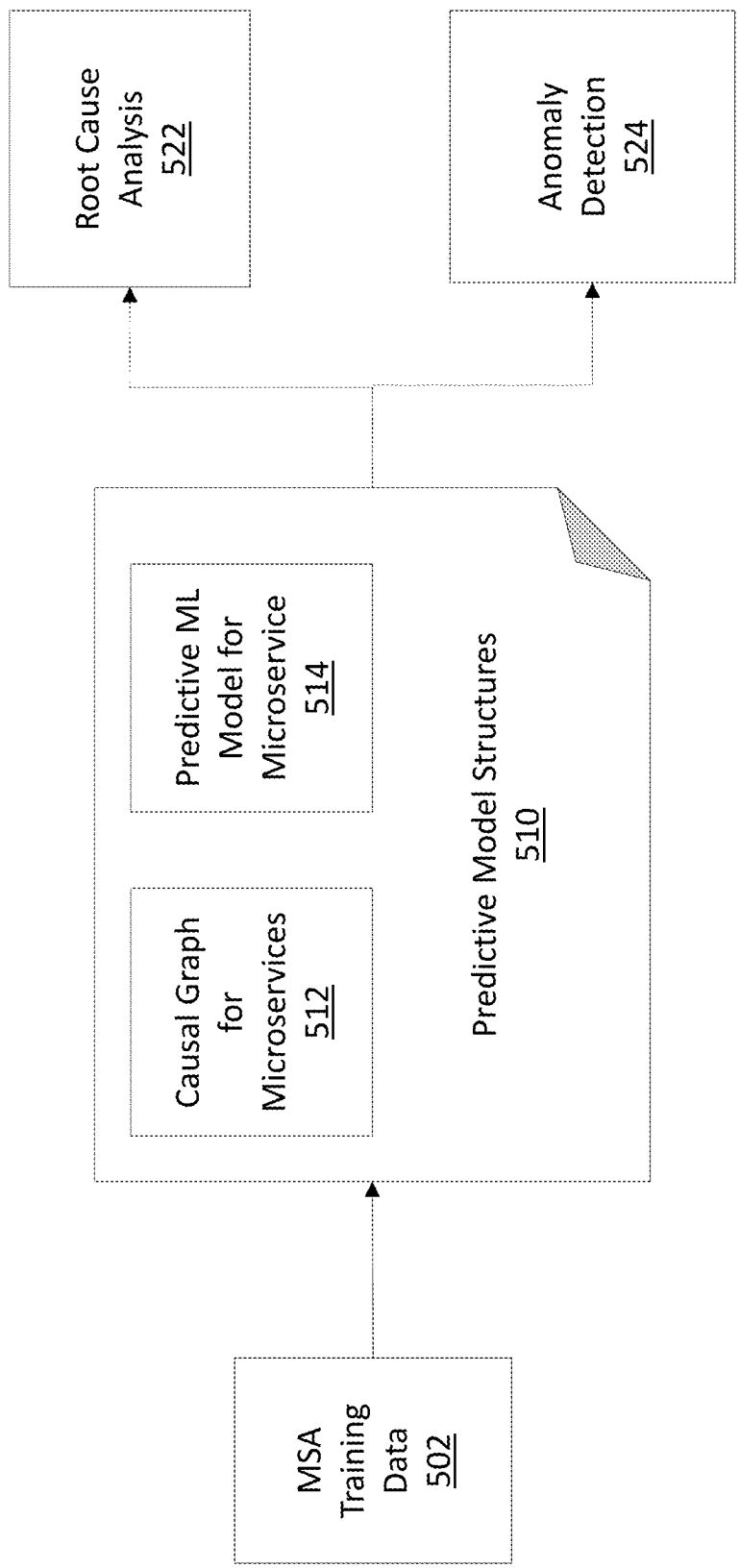
FIG. 5 illustrates root cause analysis and anomaly detection for MSAs using a trained ML model, according to one embodiment.

FIG. 5 illustrates root cause analysis and anomaly detection for MSAs using a trained ML model, according to one embodiment. At block 502, a prediction service (e.g., the prediction service 216 illustrated in FIG. 2) provides MSA training data to predictive model structures 510 for a given microservice. As discussed above, in an embodiment data reflecting features across multiple different microservices is used to predict values for a given microservice, using a trained ML model. For example, as illustrated in FIG. 1, the features 112A-K, 122A-L, and 132A-M are all used by the trained ML model 150A to determine predicted future feature values 152A. In an embodiment, the feature data can be concatenated together to generate a suitable feature vector.

As described above, however, the MSA inference data at block 502 will likely not reflect feature data for all microservices in the MSA. In an embodiment, when a fault occurs in a microservice (e.g., triggering prediction of feature data for the microservice) only a subset of nodes (e.g., a subset of microservices) are likely to be affected. The MSA training data at block 502, therefore, only include a subset of the microservices.

In an embodiment the predictive model structures 510 includes both a causal graph for the microservices (e.g., for all microservice nodes) and a predictive model for the given microservice. For example, as discussed above in relation to block 306 in FIG. 3, in an embodiment a training service can generate a weighted causal graph for all microservices. In an embodiment, the weighted causal graph includes associated causality strength for each causal relationship (e.g., between input features and output predictions) and reflects individual feature strengths for each causal relationship. As discussed above in relation to block 308 in FIG. 3, in an embodiment the training service can generate a predictive ML model for each microservice (e.g., to predict feature values for that microservice).

In an embodiment, the prediction service uses one, or both, of the predictive model structures 510 to perform root cause analysis at block 522, anomaly detection at block 524, or both. In an embodiment, anomaly detection at block 524 determines when a fault has occurred. This is discussed further below with regard to FIG. 6. Root cause analysis at block 522 identifies the microservice that is likely the root cause of a given fault, either determined by the anomaly detection at 524, or possibly given from an external module performing a separate fault detection process. For example, the causal graph 512 can be used to estimate causal relationships between microservice nodes and identify the likely candidates for the root cause of a fault. In an embodiment, the root cause analysis at block 522 can proceed by first identifying the set of services that may be an immediate cause of a given fault of interest and output them as likely root causes. In an embodiment, the root cause analysis at block 522 can also trace back paths in the causal graph and identify the set of direct or indirect causes and output them as likely root causes. In an embodiment, the root cause analysis at block 522 can further generate a ranking of suspected root cause microservice nodes, for example, by using causal strength of the causal relationship for the root cause candidate in question, or by combining the causal strength of all the causal relationships in the causal path leading to the root cause candidate in question.

In an embodiment, the root cause analysis at block 522 may also use the predictive model at block 514 through the so-called counter factual reasoning, as described in (Judea Pearl, "Causality: Models, Reasoning and Inference," Cambridge University Press, 2013) to perform root cause analysis. For example, for each candidate using the predictive model at block 514, the degree of its causal association to the fault may be determined by evaluating the difference in the predicted feature values of the faulty service at the time of the fault between what is predicted by the predictive model on the actual observed values of all relevant features prior to the fault versus what is predicted by the same model on the same observed values except the feature values of the candidate in question are replaced by the normal values that are predicted by the same model using the data immediately prior to the time of the candidate.

Figure 6:
FIG. 6 is a flowchart 600 illustrating anomaly detection for MSAs using a trained ML model, according to one embodiment.

FIG. 6 is a flowchart 600 illustrating anomaly detection for MSAs using a trained ML model, according to one embodiment. At block 602, a prediction service (e.g., the prediction service 216 illustrated in FIG. 2) identifies a trained model for a given microservice. Further, in an embodiment, the prediction service also identifies a weighted causal graph for all microservices (e.g., as discussed above in relation to FIG. 5).

At block 604, the prediction service concatenates features across microservices. For example, the prediction service can generate a feature vector reflecting feature values across multiple microservice nodes. As discussed above, the prediction service may have access to feature data for only a subset of microservices in the MSA, rather than all microservices.

At block 606, the prediction service uses a trained ML model to predict features for each microservice. As discussed above in relation to FIG. 1, a given ML model (e.g., the ML model 150A) can use a feature vector reflecting feature data across multiple microservices (e.g., the features 112A-K, 122A-L, and 132A-M) to generate predicted future feature values for a given microservice (e.g., the predicted features 152A). In an embodiment, at block 606 the prediction service uses the trained ML models to predict features for all microservices in the MSA. Alternatively, the prediction service uses the trained ML models to predict features for a subset of the microservices (e.g., a trained ML model for each respective microservice).

At block 608, the prediction service computes a measure of the prediction error, for example, the mean of the norms of the difference between the predicted and the actual next event representation over all microservices and uses that to detect anomalies. For example, the prediction service can compute the prediction error using the expression $\|x_i^+(t+1) - x_i(t+1)\|_2$ as the difference norm for each individual microservice i. The prediction service can then use the prediction error to identify likely abnormal microservice logs. The ML model predicts features values for next event at each microservice. The prediction service can then compare the predicted values with actual logged values (e.g., using the mean of norms). The prediction error, such as the magnitude of difference between the predicted feature values and the actual feature values, reflects a likelihood that an anomaly has occurred.

Figure 7:
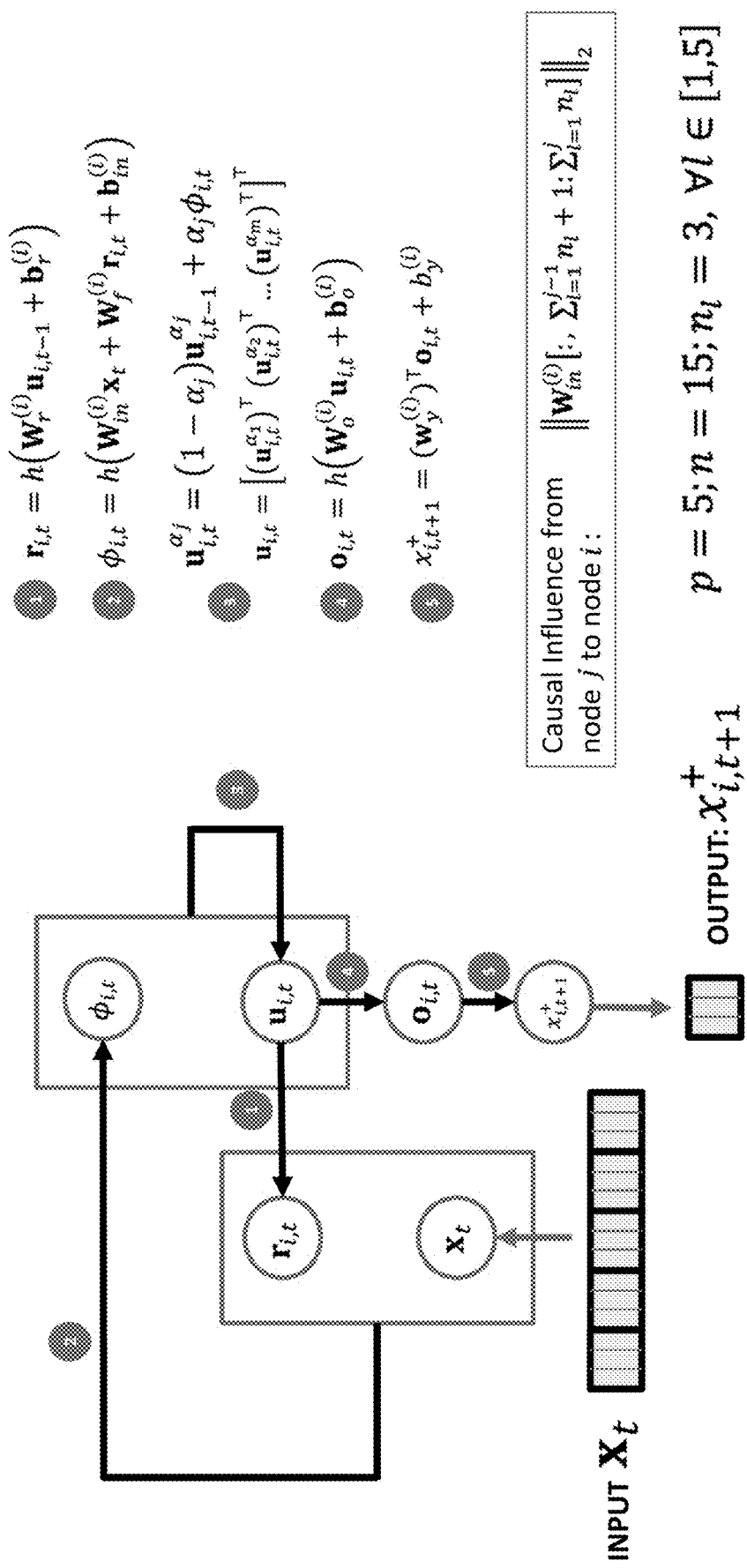
FIG. 7 illustrates use of a Statistical Recurrent Unit (SRU) architecture, including the computation stages inside a SRU, according to one embodiment.

FIG. 7 illustrates use of an SRU architecture, including the computation stages inside an SRU, according to one embodiment. In an embodiment, an SRU is a suitable neural architecture for one or more of the techniques discussed above (e.g., for the ML model 214 illustrated in FIG. 2). An SRU is a lightweight, recurrent neural network architecture that is used for the inference of Granger causality and its strength between multiple services. In particular, the SRU model for the causal inference for a service i, maintains a hidden state vector $u_i$ at all times during training, which is essentially an instance of summary statistics. If we assume that, at current time t, we input a vector $x_t$ of n elements having as components the concatenation of the numerical representations of the currently emitted events at all services, then SRU outputs $x_{i,t+1}^+$, which is the predicted numerical representation of the event emitted at service i at next time step, t+1. The SRU model learns weight matrices and biases, represented by W's and b's in the sequel, by minimizing a loss function containing distances of predictions $x_{i,t+1}^+$ to known values $x_{i,t+1}$ and regularization terms involving weight matrix elements. One of the learnt W's–$W_{in}^{(i)}$, see below, is postprocessed for inferring the strength of the causal influence of all services to service i.

More specifically, the SRU first computes a feedback vector $r_{i,t}$ using the hidden state of the previous time step: $r_{i,t}=h(W_r^{(i)}u_{i,t-1}++b_r^{(i)})$ where typically h(.) is an element-wise Rectified Linear Unit (ReLU) operator, h(z)=max(z,0). The feedback vector is subsequently combined with the input vector to produce a recurrent statistics vector: $\phi_{i,t}=h(W_{in}^{(i)}x_t+W_f^{(i)}r_{i,t}+b_{in}^{(i)})$. Recurrent statistics will then generate exponentially weighted moving summary statistics for multiple time scales using a set of fixed weights $\alpha_j \in [0,1]$: $u_{i,t}^{\alpha_j}=(1-\alpha j)u_{i,t-1}^{\alpha_j}+\alpha_j\phi_{i,t}$. These multiple-time-scaled summary statistics are concatenated: $u_{i,t}=[(u_{i,t}^{\alpha_1})^T(u_{i,t}^{\alpha_2})^T \ldots (u_{i,t}^{\alpha_m})^T]^T$ and serve as the input for computing the causal feature vector: $o_{i,t}=h(W_o^{(i)}u_{i,t}+b_o^{(i)})$. Finally, the SRU projects causal features to next time step event prediction at service i: $x_{i,t+1}^+=(w_y^{(i)})^T o_{i,t}+b_y^{(i)}$.

We allow the representation $x_{i,t}$ of a current event at service i to be a vector of $n_i \geq 1$ scalar features. Also, events at different services can have a different number of such scalar features. In the case of p services, $\Sigma_{l=1}^{p} n_l = n$, the strength of causal influence of service j to service i can be expressed as an $l_2$ norm computed over the submatrix consisting of $n_j$ columns of learnt $W_{in}^{(i)}$ (with column indices in the range $[\Sigma_{l=1}^{j-1}n_l+1,\Sigma_{l=1}^{j}n_l]$)—optionally normalized over the max of such norms. In an embodiment, FIG. 7 summarizes computation stages inside a SRU with p=5, n=15, $n_j=3$ $\forall l \in [1,5]$.

Figure 8:
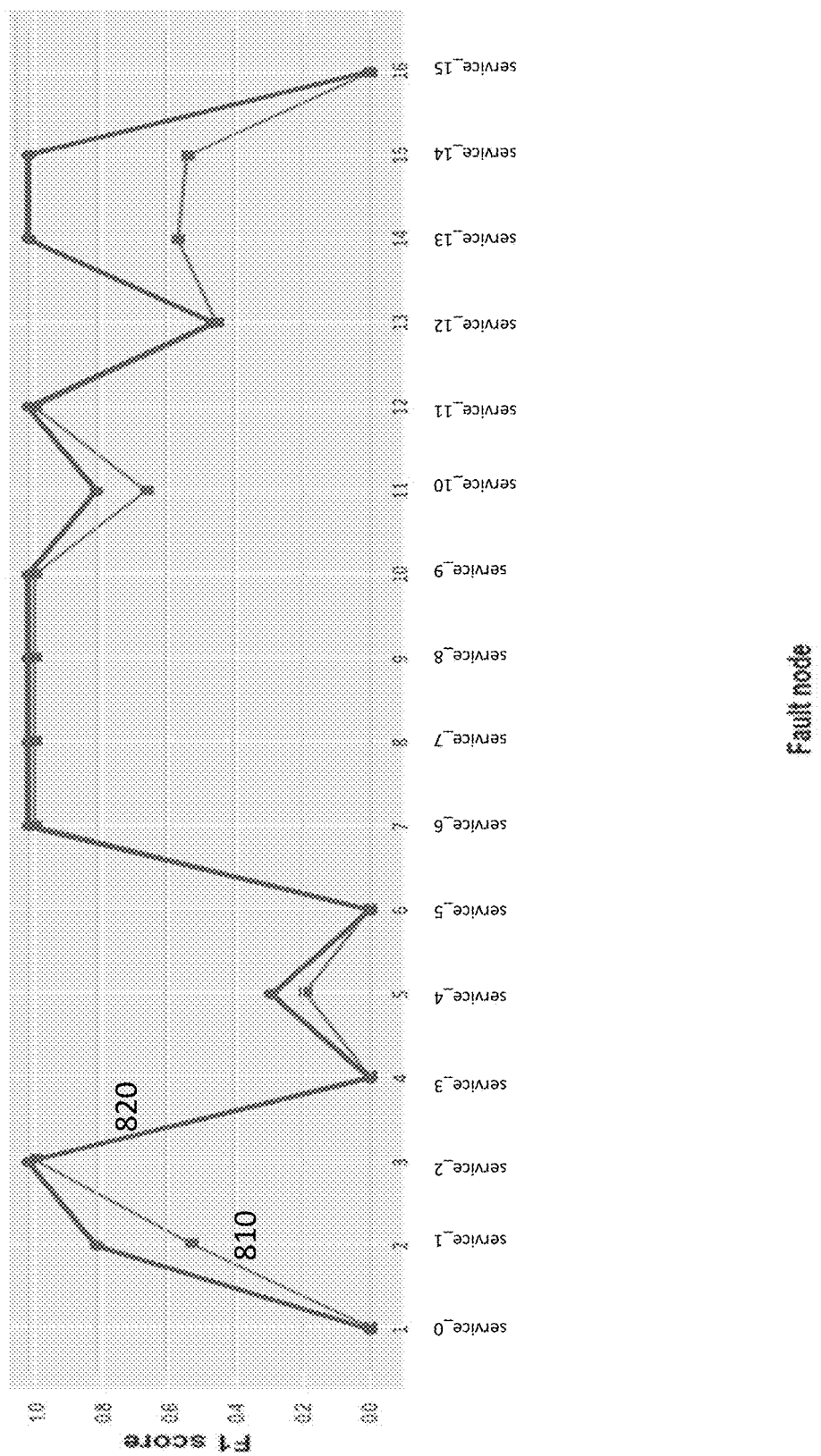
FIG. 8 is a graph demonstrating improved accuracy attained by leveraging features in learning a causal graph, according to one embodiment.

FIG. 8 is a graph demonstrating the improved accuracy attained by leveraging features in learning a causal graph, according to one embodiment. FIG. 8 illustrates using an example micro-service application that includes 41 micro-services. In this example application, faults are injected in 16 different services, and 16 corresponding log datasets are generated. The x-axis illustrates these 16 different fault nodes. The y-axis illustrates the F1 score, which is used to measure accuracy. The F1 score balances precision and recall. An F1 score of 1 indicates perfect estimation of the causal graph, and the lowest possible F1 score is 0.

Existing approaches that do not consider features use one time series per service corresponding to the absence or presence of an alert. The results of this approach are shown with a line 810. As discussed above, in an embodiment the improved techniques discussed herein leverage features. In this example, the improved system uses 3 features per service: 'http", "error" and "inactive," and uses an SRU architecture. The results of the improved system are show with a line 820. As can be seen by comparing the line 810 (e.g., an example of a prior solution that does not consider features) with the line 820 (e.g., an improved system leveraging features), the feature-based approach consistently outperforms its feature-less counterpart.

Figure 9:
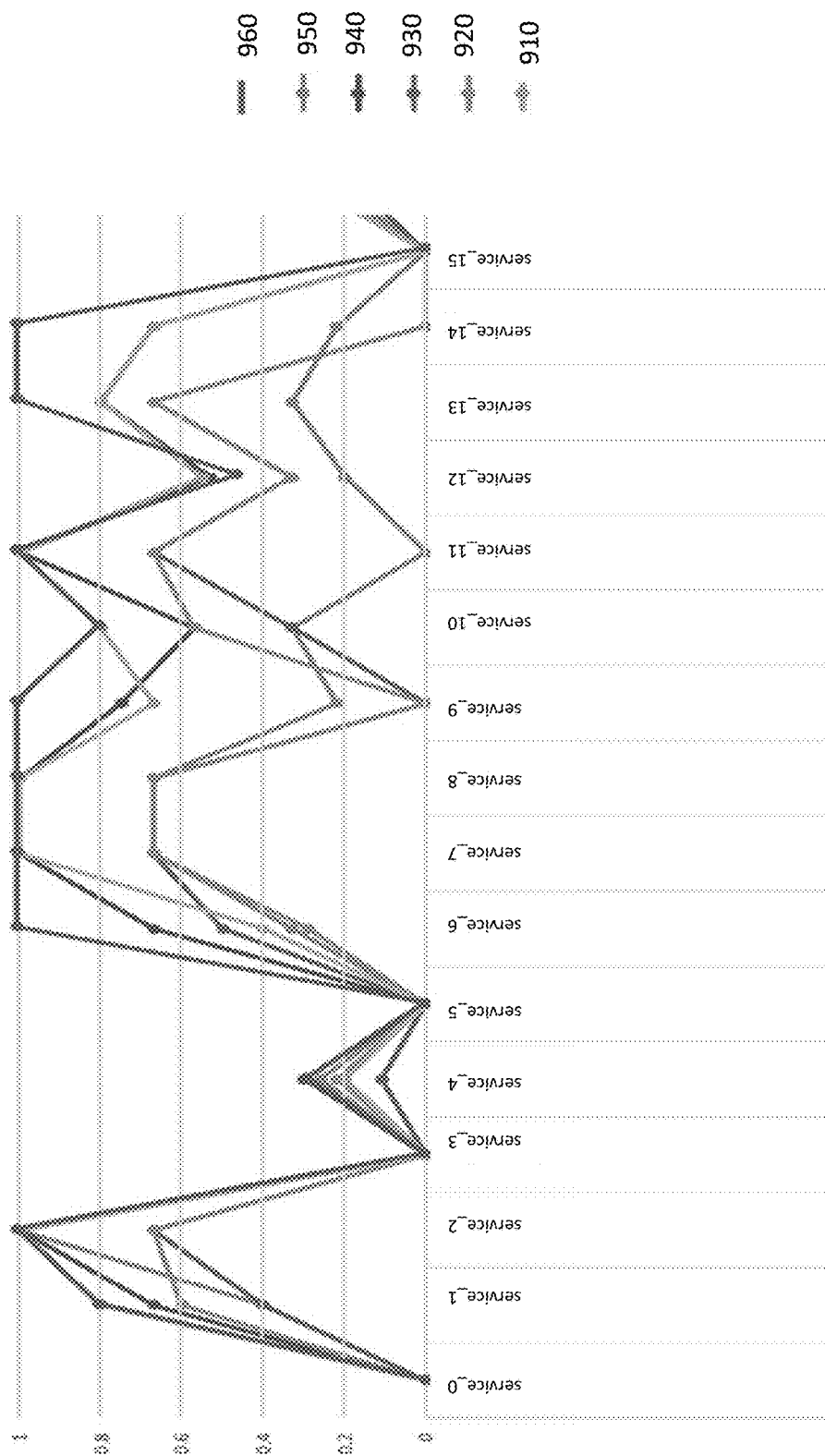
FIG. 9 is a graph demonstrating improved accuracy attained by using improved techniques discussed herein as compared to existing methods in the prior art, according to one embodiment.

FIG. 9 is a graph demonstrating improved accuracy attained by using improved techniques discussed herein as compared to existing methods in the prior art, according to one embodiment. FIG. 9 again illustrates using an example micro-service application that includes 41 micro-services, in which faults are injected in 16 different services and 16 corresponding log datasets are generated. The x-axis illustrates these 16 different fault nodes. The y-axis illustrates the F1 score, which is used to measure accuracy. The F1 score balances precision and recall. An F1 score of 1 indicates perfect estimation of the causal graph, and the lowest possible F1 score is 0.

Line 960 illustrates use of improved techniques discussed herein, along with use of an SRU architecture. Lines 910 and 950 represent two examples of existing techniques based on conditional-independence testing. Line 940 represents an existing approach using a forward and backward search algorithm to estimate the structure of a proximal graphical event model (PGEM). Lines 920 and 930 relate to existing regression-based approaches.

As can be seen in FIG. 9 by comparing the line 960, which illustrates use of improved techniques discussed herein along with use of an SRU architecture, with the lines 910-950, which illustrate prior approaches, the improved techniques outperform the comparison approaches for most datasets and are competitive in the few other datasets.

FIG. 10 is a table demonstrating improved accuracy attained by using the co-training embodiment in learning a causal graph, according to one embodiment. FIG. 10 demonstrates the effectiveness of co-training (e.g., as discussed above in relation to FIG. 3) for two datasets using an example microservices application: "service_0" and "service_1." The table in FIG. 10 exhibits the accuracy of co-training the service_0 and service_1 datasets jointly, contrasted against the accuracy when training on each dataset separately. As can be seen in the table, using co-training improves the accuracy of causal estimation.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., training service 212, ML model 214, or prediction service 216 illustrated in FIG. 2) or related data available in the cloud. For example, the training service 212 or prediction service 216 could execute on a computing system in the cloud and train the ML model 214, or use the ML model 214 to predict feature values. In such a case, the training service 212 or prediction service 216 could store the trained ML model 214, or relevant prediction data (e.g., a prediction feature vector) at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
receiving historical feature data relating to a plurality of nodes in a system;
generating a machine learning (ML) model for a node of the plurality of nodes,
wherein the ML model is trained to predict a plurality of future feature values for the node based on at least a portion of the historical feature data, and
wherein the ML model is a non-linear neural network; and
generating a causal graph for the plurality of nodes using a feature selection mechanism within the ML model, wherein the feature selection mechanism comprises a regularization term encouraging sparsity of nodes in selected features in the ML model,
wherein the regularization term comprises group-sparse regularization in which all features of each node of the plurality of nodes are forced to be either contributing or not-contributing.

2. The method of claim 1, further comprising:
predicting the plurality of future feature values for the node using the ML model; and
at least one of: (i) detecting an anomaly in the system based on the predicted plurality of feature values or (ii) identifying a root cause for a fault in one of the plurality of nodes in the system based on the ML model, the causal graph, and the predicted plurality of future feature values.

3. The method of claim 1, wherein the plurality of nodes comprise a plurality of microservices in a microservices architecture (MSA).

4. The method of claim 1, wherein the ML model and the causal graph are generated by co-training a plurality of ML models using a plurality of training feature data sets relating to a plurality of faults and using group regularization to encourage consistency among feature selection for any given node across the plurality of data sets.

5. The method of claim 4, wherein the generated causal graph comprises a weighted causal graph, and wherein the causal graph indicates causal strength for each causal relationship among the plurality of nodes.

6. The method of claim 5, wherein the causal strength is computed based on a norm of input model coefficients corresponding to each node.

7. The method of claim 1, wherein the ML model is trained to predict the future feature values for the node using pre-processed training data relating to all of the plurality of nodes.

8. The method of claim 1, wherein the ML model is trained using regularization parameters set reflecting the topology of the plurality of nodes in the system.

9. The method of claim 1, wherein the ML model comprises a multi-variate recurrent neural network.

10. The method of claim 1, wherein each of multiple sets of pre-processed training data, comprising historical feature data, reflect only a subset of feature data available for the plurality of nodes in the system.

11. The method of claim 1, further comprising:
at least one of: (i) detecting an anomaly in the system based on a prediction error relating to a predicted plurality of feature values or (ii) identifying a root cause for a fault in one of the plurality of nodes in the system based on the ML model, the causal graph, and the prediction error relating to the predicted plurality of future feature values,
wherein the prediction error is computed using a mean of norms of the difference between the predicted and the actual feature values for the node in question.

12. The method of claim 1,
identifying a root cause for a fault in a first node of the plurality of nodes in the system using the generated causal graph.

13. The method of claim 12, wherein identifying the root cause comprises:
identifying a first set of nodes that may be an immediate cause of the fault;
tracing back paths in the causal graph to identify second set of direct or indirect causes of the fault;
outputting the first set and the second set as likely root causes.

14. The method of claim 12, wherein identifying the root cause comprises:
generating a ranking of suspected root cause nodes by at least one of: (i) using causal strength of a causal relationship for the root cause candidate in question, or (ii) combining the causal strength of all causal relationships in a causal path leading to the root cause candidate in question.

15. The method of claim 12, wherein identifying the root cause comprises:
using the ML model through counter factual reasoning, wherein for each candidate node a degree of its causal association to the fault may be determined by evaluating a difference between: (i) feature values for the first node predicted by the ML model using actual observed values of features prior to the fault and (ii) feature values for the first node predicted by the ML model using actual observed values, except that feature values relating to the candidate node are replaced by normal values predicted using earlier data.

16. A system, comprising:
one or more computer processors; and
a memory containing a program which when executed by the one or more computer processors performs an operation, the operation comprising:
receiving historical feature data relating to a plurality of nodes in the system;
generating a machine learning (ML) model for a node of the plurality of nodes,
wherein the ML model is trained to predict a plurality of future feature values for the node based on at least a portion of the historical feature data, and
wherein the ML model comprises a neural network trained using group sparse regularization; and
generating a causal graph for the plurality of nodes using a feature selection mechanism within the ML model, wherein the feature selection mechanism comprises a regularization term encouraging sparsity of nodes in selected features in the ML model,
wherein the ML model and the causal graph are generated by co-training a plurality of ML models using a plurality of training feature data sets relating to a plurality of faults and using group regularization to encourage consistency among feature selection for any given node across the plurality of data sets,
wherein the generated causal graph comprises a weighted causal graph, and
wherein the causal graph indicates causal strength for each causal relationship among the plurality of nodes, and the causal strength is computed based on a norm of input model coefficients corresponding to each node.

17. The system of claim 16, wherein the plurality of nodes comprise a plurality of microservices in a microservices architecture (MSA).

18. The system of claim 16, wherein the ML model and the causal graph are generated by co-training a plurality of ML models using a plurality of training feature data sets relating to a plurality of faults and using group regularization to encourage consistency among feature selection for any given node across the plurality of data sets.

19. A computer program product, comprising:
a computer-readable storage medium having computer-readable program code embodied therewith, the computer-readable program code executable by one or more computer processors to cause the one or more computer processors to perform an operation, the operation comprising:
receiving historical feature data relating to a plurality of nodes in a system;
generating a machine learning (ML) model for a node of the plurality of nodes, wherein the ML model is trained to predict a plurality of future feature values for the node based on at least a portion of the historical feature data;
generating a causal graph for the plurality of nodes using a feature selection mechanism within the ML model, wherein the feature selection mechanism comprises a regularization term encouraging sparsity of nodes in selected features in the ML model; and
at least one of: (i) detecting an anomaly in the system based on a prediction error relating to a predicted plurality of feature values or (ii) identifying a root cause for a fault in one of the plurality of nodes in the system based on the ML model, the causal graph, and the prediction error relating to the predicted plurality of future feature values,
wherein the prediction error is computed using a mean of norms of the difference between the predicted and the actual feature values for the node in question.

20. The computer program product of claim 19, wherein the ML model is trained using regularization parameters set reflecting the topology of the plurality of nodes in the system.

21. The computer program product of claim 19, wherein the ML model comprises a multi-variate recurrent neural network.

22. A method comprising:
receiving historical feature data relating to a plurality of nodes in a system;
generating a machine learning (ML) model for a node of the plurality of nodes,
wherein the ML model is trained to predict a plurality of future feature values for the node based on at least a portion of the historical feature data, and
wherein the ML model is a non-linear comprises a neural network trained using group sparse regularization;
generating a causal graph for the plurality of nodes using a feature selection mechanism within the ML model, wherein the feature selection mechanism comprises a regularization term encouraging sparsity of nodes in selected features in the ML model,
wherein the ML model and the causal graph are generated by co-training a plurality of ML models using a plurality of training feature data sets relating to a plurality of faults and using group regularization to encourage consistency among feature selection for any given node across the plurality of data sets,
wherein the generated causal graph comprises a weighted causal graph, and
wherein the causal graph indicates causal strength for each causal relationship among the plurality of nodes, and
wherein the causal strength is computed based on a norm of input model coefficients corresponding to each node; and
predicting the plurality of future feature values for the node using the ML.

23. A method, comprising:
receiving historical feature data relating to a plurality of nodes in a system;
generating a machine learning (ML) model for a node of the plurality of nodes,
wherein the ML model is trained to predict a plurality of future feature values for the node based on at least a portion of the historical feature data, and wherein the ML model is a non-linear neural network;

generating a causal graph for the plurality of nodes using a feature selection mechanism within the ML model, wherein the feature selection mechanism comprises a regularization term encouraging sparsity of nodes in selected features in the ML model; and identifying a root cause for a fault in a first node of the plurality of nodes in the system using the generated causal graph, comprising:

using the ML model through counter factual reasoning, wherein for each candidate node a degree of its causal association to the fault may be determined by evaluating a difference between: (i) feature values for the first node predicted by the ML model using actual observed values of features prior to the fault and (ii) feature values for the first node predicted by the ML model using actual observed values, except that feature values relating to the candidate node are replaced by normal values predicted using earlier data.

24. The method of claim 22, wherein the plurality of nodes comprise a plurality of microservices in a microservices architecture (MSA).

25. The method of claim 23, wherein the plurality of nodes comprise a plurality of microservices in a microservices architecture (MSA).

\* \* \* \* \*